(12) United States Patent
Holz et al.

(10) Patent No.: US 11,911,915 B2
(45) Date of Patent: Feb. 27, 2024

(54) DETERMINING ROBOTIC CALIBRATION PROCESSES

(71) Applicant: Intrinsic Innovation LLC, Mountain View, CA (US)

(72) Inventors: Dirk Holz, Mountain View, CA (US); Timothy Robert Kelch, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 142 days.

(21) Appl. No.: 17/343,312

(22) Filed: Jun. 9, 2021

(65) Prior Publication Data
US 2022/0395980 A1 Dec. 15, 2022

(51) Int. Cl.
*B25J 9/16* (2006.01)
*B25J 9/08* (2006.01)
*G05B 19/4155* (2006.01)

(52) U.S. Cl.
CPC ............ *B25J 9/1692* (2013.01); *B25J 9/163* (2013.01); *G05B 19/4155* (2013.01); *B25J 9/08* (2013.01); *G05B 2219/39019* (2013.01)

(58) Field of Classification Search
CPC . B25J 9/1692; B25J 9/163; B25J 9/08; G05B 19/4155; G05B 2219/39019; G05B 2219/39016; G05B 2219/39022
(Continued)

(56) References Cited

U.S. PATENT DOCUMENTS

| 4,639,878 A | * | 1/1987 | Day | G05B 19/4083 700/193 |
| 4,852,018 A | * | 7/1989 | Grossberg | G05B 19/414 706/904 |

(Continued)

FOREIGN PATENT DOCUMENTS

EP 3338969 6/2018

OTHER PUBLICATIONS

Anonymous: "AdeptSight User's Guide, v3.2.x" In: "AdeptSight User's Guide, v3.2.x", Aug. 23, 2012 {Aug. 23, 2012), Adept technology, Inc,, US, XP055483538, pp. 1-646, Retrieved from the Internet: URL:http://wwwl.adept.com/main/ke/data/pdf_web/AdeptSight_UG.pdf> (Year: 2012).*

(Continued)

*Primary Examiner* — Jaime Figueroa
(74) *Attorney, Agent, or Firm* — Fish & Richardson P.C.

(57) ABSTRACT

Methods, systems, and apparatus, including computer programs encoded on a computer storage medium that automatically calibrates robots and sensors assigned to perform a task in an operating environment. One of the methods includes obtaining a representation of a robotic operating environment. A user selection of a plurality of components to be configured to operate in the robotic operating environment is received. A mapping is obtained between pairs of components to be calibrated and one or more respective calibration processes to perform to calibrate each pair of components. From the mapping, one or more calibration processes to be performed on pairs of components based on the user selection of the plurality of components is computed. Calibration instruction data describing how to perform the one or more calibration processes to be performed on the pairs of components of the user selection is determined and presented.

21 Claims, 3 Drawing Sheets

(58) Field of Classification Search
USPC ................ 700/245–264; 318/568.11–568.25
See application file for complete search history.

(56) References Cited

U.S. PATENT DOCUMENTS

| | | | | |
|---|---|---|---|---|
| 5,297,238 | A * | 3/1994 | Wang | B25J 9/1697 |
| | | | | 700/254 |
| 5,471,312 | A * | 11/1995 | Watanabe | B25J 9/1692 |
| | | | | 347/256 |
| 6,044,308 | A | 3/2000 | Huissoon | |
| 6,070,109 | A | 5/2000 | McGee et al. | |
| 6,075,334 | A * | 6/2000 | Sagues | H01L 21/67766 |
| | | | | 414/416.03 |
| 6,321,137 | B1 | 11/2001 | de Smet | |
| 6,356,808 | B1 * | 3/2002 | Stenberg | B25J 9/1692 |
| | | | | 318/568.13 |
| 6,408,252 | B1 * | 6/2002 | De Smet | B25J 9/1692 |
| | | | | 700/254 |
| 6,434,449 | B1 * | 8/2002 | De Smet | B25J 9/1692 |
| | | | | 414/730 |
| 6,675,063 | B2 | 1/2004 | Bosley | G11B 15/6835 |
| | | | | 700/214 |
| 7,756,608 | B2 | 7/2010 | Brogardh | |
| 7,945,349 | B2 * | 5/2011 | Svensson | B25J 9/1692 |
| | | | | 901/6 |
| 8,457,786 | B2 * | 6/2013 | Andersson | G05B 19/401 |
| | | | | 33/558.2 |
| 8,485,017 | B1 | 7/2013 | Trompeter | |
| 8,989,897 | B2 | 3/2015 | de Smet | |
| 9,248,573 | B2 * | 2/2016 | SøE-Knudsen | B25J 9/1692 |
| 9,266,241 | B2 | 2/2016 | Trompeter | |
| 9,457,470 | B2 | 10/2016 | Lundberg | |
| 9,538,156 | B2 * | 1/2017 | Densham | G01S 3/802 |
| 9,833,897 | B2 * | 12/2017 | SøE-Knudsen | B25J 9/1682 |
| 10,373,336 | B1 * | 8/2019 | Islam | B25J 9/1697 |
| 10,399,227 | B1 * | 9/2019 | Islam | B25J 9/1692 |
| 2002/0188379 | A1 * | 12/2002 | McGee | B25J 9/1692 |
| | | | | 318/568.12 |
| 2004/0172164 | A1 * | 9/2004 | Habibi | G06T 1/0007 |
| | | | | 700/245 |
| 2009/0015722 | A1 | 6/2009 | Smet | |
| 2010/0262288 | A1 * | 10/2010 | Svensson | B25J 9/1671 |
| | | | | 700/254 |
| 2011/0022216 | A1 * | 1/2011 | Andersson | G05B 19/401 |
| | | | | 700/114 |
| 2013/0079928 | A1 * | 3/2013 | Soe-Knudsen | B25J 9/1694 |
| | | | | 700/254 |
| 2013/0147944 | A1 * | 6/2013 | Zhang | B25J 9/1687 |
| | | | | 348/95 |
| 2013/0307934 | A1 * | 11/2013 | Densham | G03B 31/00 |
| | | | | 348/46 |
| 2015/0148957 | A1 * | 5/2015 | Kuffner, Jr. | B25J 9/1692 |
| | | | | 700/254 |
| 2015/0266183 | A1 | 9/2015 | Alifragkis et al. | |
| 2016/0059419 | A1 * | 3/2016 | Suzuki | B25J 9/1692 |
| | | | | 901/14 |
| 2016/0136805 | A1 * | 5/2016 | Søe-Knudsen | B25J 9/1656 |
| | | | | 700/254 |
| 2016/0207200 | A1 * | 7/2016 | Kuffner, Jr. | H04L 67/12 |
| 2017/0021503 | A1 | 1/2017 | Kuffner et al. | |
| 2017/0151670 | A1 * | 6/2017 | Huang | B25J 9/1692 |
| 2018/0178338 | A1 * | 6/2018 | Chen | B23Q 1/34 |
| 2018/0178388 | A1 * | 6/2018 | Ishige | B25J 9/1692 |
| 2018/0313942 | A1 | 11/2018 | Wu et al. | |
| 2019/0064333 | A1 * | 2/2019 | Wu | G01B 11/26 |
| 2019/0171187 | A1 * | 6/2019 | Cella | G05B 19/4183 |
| 2020/0016757 | A1 * | 1/2020 | Sakuramoto | B25J 13/08 |
| 2020/0282575 | A1 * | 9/2020 | Haeusler | B25J 9/1612 |
| 2021/0023713 | A1 * | 1/2021 | Zhang | B25J 9/1697 |
| 2021/0096252 | A1 * | 4/2021 | Wu | G01S 17/42 |
| 2021/0146942 | A1 * | 5/2021 | Hrabe | G01D 18/00 |
| 2022/0297301 | A1 * | 9/2022 | Kelch | B25J 9/1692 |
| 2022/0331968 | A1 * | 10/2022 | Ryu | G01S 17/86 |
| 2023/0015889 | A1 * | 1/2023 | Cullen | G06T 7/80 |

OTHER PUBLICATIONS

U.S. Appl. No. 17/203,147, filed Mar. 16, 2021, Kelch et al.
[No Author Listed] "AdeptSight User's Guide, v3.2.x," Aug. 23, 2012, Adept Technology Inc., 24 pages.
International Search Report and Written Opinion in International Appln. No. PCT/US2022/032492, dated Sep. 20, 2022, 16 pages.
Pagani et al., "Cabot User Frame Calibration: Evaluation and Comparison between Positioning Repeatability Performances Achieved by Traditional and Vision-Based Methods," Robotics, Mar. 2021, 10(1):45.

* cited by examiner

DETERMINING ROBOTIC CALIBRATION PROCESSES

BACKGROUND

This specification relates to robotics, and more particularly to techniques for automatically calibrating robots and sensors assigned to perform a task in an operating environment.

In robotics systems, the physical robotic movements to perform tasks are often scheduled by manual pre-programming. For example, a warehouse robot that moves boxes can be programmed to pick up a box at the entrance of a warehouse, move it, and put it down in a target zone of the warehouse. For another example, a construction robot can be programmed to pick up a beam and put it down onto a bridge deck. As each of these actions can include many movements that require high precision, a slight error in the measurement of a robot pose or a pose of a detected object can result in failure of the task. Moreover, errors at an early stage in the process can result in accumulated errors in robotic movements later in the task, further resulting in failed tasks using a pre-programmed schedule.

Thus, systems having multiple robots and sensors can use various techniques to calibrate their components and calculate one or more measures of calibration accuracy. For example, some systems adopt hand-eye calibrations in an operating environment, e.g., a workcell, to optimize calibration. In other examples, a camera must be properly calibrated with respect to a robot that exists in the same workcell, or multiple cameras, perhaps of different types, must be calibrated with respect to one or more robots.

However, the knowledge required to optimally calibrate an operating environment is difficult to acquire and to apply. First, relevant knowledge and expertise required to calibrate a robot installation may be held only by a small subset of entities involved in supplying, assembling, configuring, calibrating or operating a robotic workcell. Such entities can include, for example, manufacturers of robots, sensors and related materials; workcell installers, who tend to be highly trained engineers; workcell operators, who are trained in the relevant operational processes; suppliers of workcell calibration hardware or software; computer-aided design users; and personnel employed associated with other operating environments. Information about proper calibration techniques that is possessed by these disparate parties is generally not systematically collected or deployed, complicating the calibration process.

In addition, even information that is available can be difficult to apply correctly. An operating environment can include numerous combinations of robots and sensors. Determining the correct calibration of any given combination is complex and error-prone. Adding further complication, each type of robot or sensor can vary in capabilities and calibration approach, so proper calibration can require not only detailed knowledge of the type of robot or sensor, but also the particular model, perhaps even including the version of software installed. For example, calibrating a camera that takes two-dimensional images can differ substantially from calibrating a camera that takes three-dimensional images, and each type of camera can different software versions installed. The possible combinations of hardware (robots and sensors) including model numbers and versions of installed software grow exponentially, and thus, determining the proper calibration steps can be enormously complex.

SUMMARY

This specification describes techniques that can automatically determine the processes required to calibrate equipment within a robotic operating environment. This information can then be conveyed through a user interface to one or more users, thereby allowing relatively unskilled or inexperienced personnel to properly calibrate robots and sensors in a workcell.

Particular embodiments of the subject matter described in this specification can be implemented so as to realize one or more of the following advantages.

The techniques described below can increase the accuracy and efficiency of calibrating components of a workcell. A system incorporating the techniques described below can provide, for an operating environment, recommended processes for calibrating the components of the operating environment. An entity tasked with calibrating the environment can thus execute the recommended calibration steps, thereby reducing the likelihood that the entity will perform calibration steps that result in degraded accuracy or a dangerous condition. In addition, an entity tasked with calibrating the components of an operating environment need not search manuals and other sources of calibration information in order to learn the preferred calibration steps. This technological capability is an improvement to the technological problem of setting up and calibrating robotic workcells, which often require high degrees of precision to operate effectively.

The techniques described below use rules or other information to automate what was previously only capable of being performed by highly trained human engineers. Therefore, a system incorporating the techniques below can be used to automate the generation of calibration processes required for a particular workcell, which allows a far greater number of users to accurately calibrate components in an operating environment by merely following the generated calibration processes rather than relying on skill and experience of human experts. The techniques described below perform a new and unconventional technological process to automate a highly complicated task that was previously only performed by humans.

In addition, the techniques described below can automatically improve calibration accuracy of robotic processes by using the encoded or learned calibration processes that provide more accurate calibration. Specifically, the system can incorporate information from installers, operators, manufacturers, suppliers and other entities so that the system can provide highly sophisticated calibration guidance. The system can allow any such entity to update the information provided to the system as knowledge about preferred calibration processes improves.

A system incorporating the techniques described below can also completely automate the calibration process, thereby eliminating the need for manual calibration. The system can provide to an operating environment a description of steps to be performed automatically by components of the operating environment. These steps can include all steps needed to calibrate the operating environment, eliminate the need for manual calibration, or a subset of the steps needed to calibrate the operating environment, reducing the need for manual calibration.

Furthermore, the described techniques provide information to users involved in calibrating components of an operating environment by providing, in a user interface, information about the components of the operating environment, including robots and sensors, along with the relevant calibration processes. When such users select subsets of the robots and sensors in the user interface, the user interface provides information relevant to the calibration processes for those selected robots and sensors.

In addition, the techniques described below can enable detection of calibration deviations in a previously calibrated system (e.g., a component of the workcell was moved) and enumerate steps necessary to improve the calibration.

One aspect features obtaining a representation of a robotic operating environment. A user selection of a plurality of components to be configured to operate in the robotic operating environment is received. The plurality of components can include one or more robots and one or more sensors. A mapping is obtained between pairs of components to be calibrated and one or more respective calibration processes to perform to calibrate each pair of components. From the mapping, one or more calibration processes to be performed on pairs of components based on the user selection of the plurality of components is computed. Calibration instruction data describing how to perform the one or more calibration processes to be performed on the pairs of components of the user selection is determined. The calibration instruction data for calibrating the user selection of the plurality of components in the robotic operating environment is presented.

One or more of the following features can be included. The calibration instruction data describing a calibration process to be performed on at least one component in the operating environment can also include data describing at least one second component in the operating environment, and the calibration process can calibrate a first component with respect to a second component.

The calibration information can reflect the outcome of performing calibration processes in a second operating environment. The calibration engine can perform the processes identified by the calibration instruction data.

The calibration information can be a set of rules. At least one rule in the set of rules can contain at least one predicate and at least one result, where the result is related to calibration instruction data. The system can evaluate at least one rule to determine calibration instruction data. The operating environment can be a physical workcell or a virtual representation of a physical workcell. The server can obtain the results of executing at least one calibration process in a second operating environment and adjust at least one calibration information data, where the adjustment relates to the obtained results.

The calibration instruction data can include an indication of accuracy. The calibration instruction data can include an indication of complexity associated with performing at least one calibration process. The server system can determine calibration instruction data by (i) providing calibration data to a machine learning model that is configured to recommend calibration information data; (ii) executing the machine learning model; and (iii) determining calibration information data from the results of executing the machine learning model. The server system can determine recommendations relating to components in the operating environment. The recommendations can relate to improving the accuracy associated with at least one calibration instruction data. The server can present indications of the recommendations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
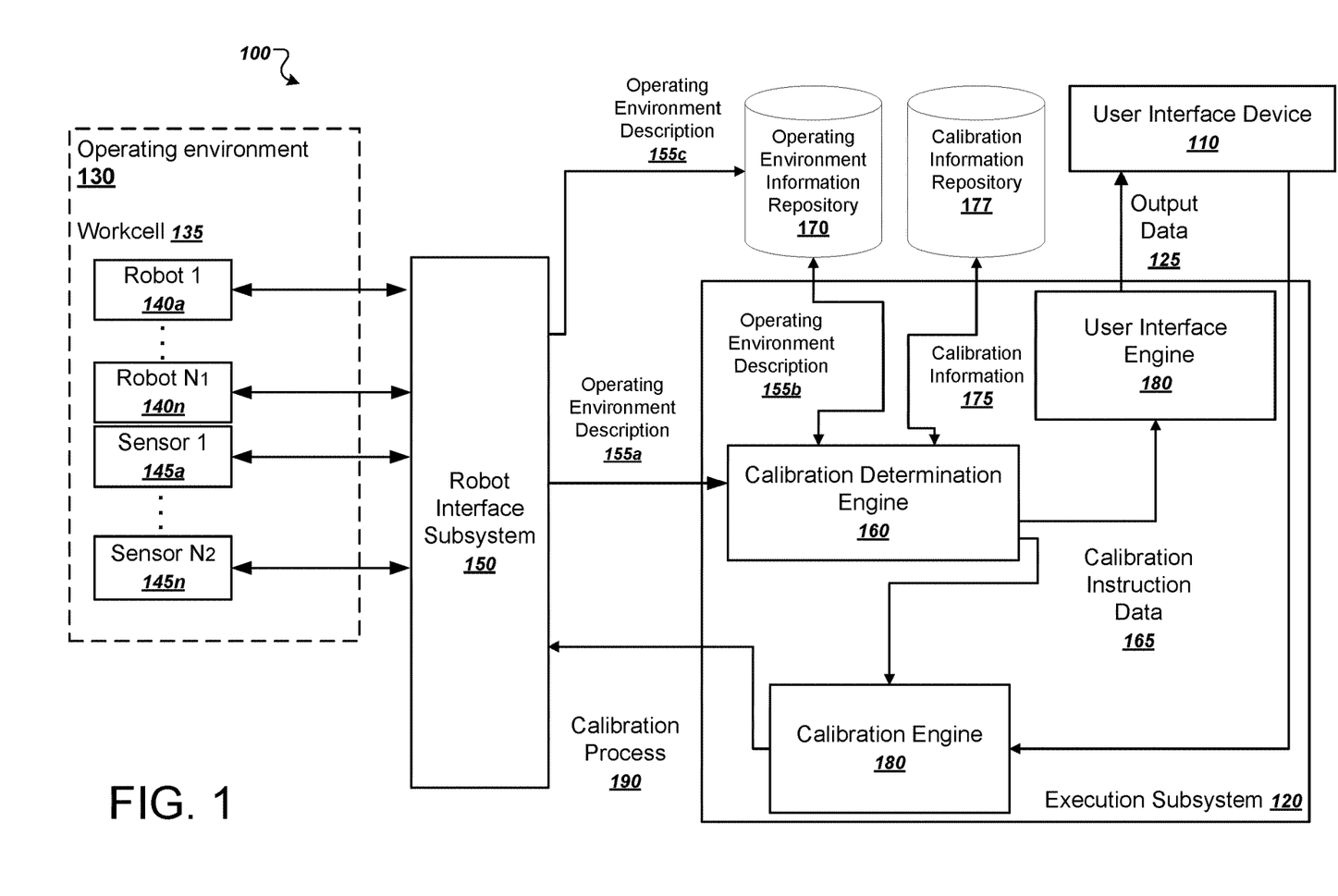
FIG. 1 illustrates an example system that determines calibration instruction data which describes calibration processes to be performed on components of an operating environment such as workcell.

FIG. 1 illustrates an example system 100 that can generate calibration instruction data 165, which describes calibration processes 190 to be performed on components of an operating environment 130 such as workcell 135. Components of an operating environment 130 can include robots 140a-140n and sensors 145a-145n. The system 100 determines the calibration instruction data 165 based on calibration information 175 that relates to components of the operating environment 130. The system 100 can transmit information related to the calibration instruction data 165 to a user interface device 110 and/or to a robot interface subsystem 150.

The system 100 can obtain an operating environment description 155 of a robot operating. The operating environment description 155a can be indicative of the components present in the operating environment 130. The operating environment description 155a can relate to a physical operating environment 130 such as a workcell 135 or to a virtual representation of an operating environment 130. The system 100 can obtain a virtual representation of the operating environment 130 that was created using a computer aided design (CAD) tool or other virtual modeling system.

The system 100 can obtain the operating environment description 155a from a robot interface subsystem 150 coupled to an operating environment 130. The system can also obtain the operating environment description 155b from an operating environment information repository 170. The system 100 can retrieve an operating environment description 155b from a repository 170 using a database query, for example, expressed in SQL. The system 100 can retrieve operating environment information 155a from the robot interface subsystem 150. The robot interface subsystem 150 can also provide operating environment descriptions 155c to the operating environment information repository 170 where the operating environment description 155c becomes available to the calibration determination engine 160.

The system 100 can use the operating environment description 155 to determine components of the operating environment. In one implementation, the operating environment description 155 can contain a general identifier of the configuration, such as "config 1" that is used to retrieve a more detailed description of the components of the operating environment 130. For example, the system 100 can use the identifier as an index into a database that contains, for an index, a listing of the components in the operating environment 130. In another implementation, the operating environment description 155 can contain a detailed description of components of the operating environment 130. For example, the description might indicate that the operating environment 130 contains two cameras, models C1 and C2, and one robot of type R7. In another implementation, information related to an operating environment description 155 can be provided through a user interface device 110 which can pass the information to a user interface engine 180 in the system 100.

The system 100 can obtain calibration information 175 that is used by the system 100 to create calibration instruction data 165. The calibration information 175 can be stored in a calibration information repository 177 and retrieved by the system 100. The calibration information repository 177 can be any conventional repository technology, such as relational database or a file system.

In this specification, calibration information 175 is data that maps a set of components in a robotic operating environment to one or more calibration processes to be performed for those components to operate effectively in the operating environment. Calibration information 175 can be data that indicates that one component should be calibrated with respect to a second component, such as a camera with respect to a robot arm, or that a component should be calibrated with respect to a global reference frame. Suitable techniques for calibrating pairs of entities are described in commonly-owned U.S. application Ser. No. 17/203,147, entitled "DETECTING ROBOTIC CALIBRATION ACCURACY DISCREPANCIES," and filed Mar. 16, 2021, which is herein incorporated by reference.

For example, the calibration information 175 can be expressed as a set of rules that map components of the operating environment 130 to calibration instruction data 165. For example, if the operating environment 130 contains a camera of model C1 and a robot of type R7, a rule might specify that the calibration instruction data 165 should include an indication that a hand-eye calibration should be performed Alternatively or in addition, the calibration information 175 can be generated by a machine learning model. The machine learning model can be trained using features of the operating environment 130, such as components of a workcell 135 and results obtained when the system 100 previously executed calibration processes. The machine learning model can be any appropriate model, e.g., a classification model such as a decision tree, used to map components of a workcell environment to calibration instruction data 165.

The calibration information 175 can also include additional information related to the calibration processes. For example, for a calibration process, the calibration information 175 can include indications of the accuracy of the calibration process and the complexity required to execute the calibration process.

Some aspects of the calibration information 175 can be provided to the system 100, for example as supplied by the manufacturer of a component of a workcell 135. For example, a manufacturer that supplies both a sensor 145*a*, such a camera model C1, and a robot 140*a* model R1 might specify as calibration information 175 a rule such as: "for the <camera, robot> pair <C1, R1>, perform hand-eye calibration H1," where H1 describes the steps required to complete the calibration.

Alternatively or in addition, the system 100 can create calibration information 175 based on information reflecting the outcome of performing calibration processes in a second operating environment 130. For example, parties relevant to operating environments 130 can choose to collaborate by sharing calibration information 175 developed for their respective operating environments. Such parties might be associated with the same company, or be associated with different companies that have chosen to share calibration information 175. Such calibration information can be shared directly among the parties or contributed to a shared repository 177 that is used by various instances of the system 100. Parties relevant to operating environments 130 can include equipment manufacturers, workcell 135 installers, workcell 135 operators, calibration system suppliers, and other parties with some relationship to the workcell 135.

In some implementations, the system 100 adjusts the calibration information 175 for an operating environment 130 based on information reflecting the outcome of performing calibration processes in a second operating environment. For example, if the system 100 performs two alternate calibration processes in a second operating environment, with one of the processes resulting in increased accuracy, the system 100 can adjust the calibration information 175 associated with operating environment 130.

The system 100 can include a calibration determination engine 160 that determines calibration instruction data 165. The calibration determination engine 160 can the information contained in the calibration information 175 along with information about the operating environment 130. For example, if the calibration information 175 contains a set of rules, the calibration determination engine 160 can evaluate the relevant rules to produce the calibration instruction data 165. Alternatively or in addition, if the calibration information includes an indication of a machine learning model, the calibration determination engine 160 can evaluate the machine learning model to produce the calibration instruction data 165.

When determining calibration instruction data 165, the calibration determination engine 160 can consider additional information included in the calibration information 175. For example, if the calibration determination engine 165 is selected between two instances of calibration instruction data 165, the calibration determination engine 165 can select the calibration instruction data 165 with the higher accuracy. Alternatively, the calibration determination engine 165 can select the calibration instruction data 165 with the lower complexity.

The calibration instruction data 165 can include an indication of accuracy. Such an indication would describe the expected accuracy of performing the calibration processes described in the calibration instruction data 165. The accuracy can be expressed as an average accuracy, maximum accuracy, minimum accuracy, an alternate measure of accuracy, or any combination.

The calibration instruction data 165 can include an indication of complexity. The indication would describe the expected complexity associated with performing the calibration processes described in the calibration instruction data 165.

The system 100 can deliver the calibration instruction data 165 produced by the calibration determination engine 165 to a calibration engine 180. The calibration engine 180 interacts with the robot interface subsystem 150 causes the robot interface subsystem 150 to perform the calibration processes described in the calibration instruction data 165.

Alternatively or in addition, the system 100 can pass the calibration instruction data 165 to a user interface engine 180. The user interface engine 180 creates output data 125 associated with the calibration instruction data 165 for display on a user interface device 110. The output data 125 can contain a human-readable description of the calibration processes described by the calibration instruction data 165. The output data 125 can also include descriptions of accuracy and/or complexity.

The output data 165 can include an indication that the user is to be given the option to initiate the calibration process. This indication, when rendered on the output device 110, could be expressed as a button marked "begin calibration." When selected, the user interface device 110 can send a signal to the calibration engine 180 indicating that the calibration engine 180 should initiate the calibration process.

The system 100 can recommend changes to the operating environment. For example, a recommendation, if implemented, can improve calibration accuracy which in turn can improve the accuracy of the robotic processes. In one implementation, the system 100 can determine that two operating environments 130 are identical except for the model of one device in the operating environment 130. For example, one operating environment 130 can have a sensor 145a of model A and a different operating environment can have a sensor 145a of model B. When the system executes the calibration determination engine 160 on these operating environments 130, the calibration determination engine 160 produces a first calibration instruction data 165 for the operating environment 130 with the sensor 145a of model A and a second calibration instruction data 165 for the operating environment 130 with the sensor 145a of model B. If the second calibration instruction data 165 contains an indication of accuracy that is higher than the indication of accuracy in the first calibration instruction data 165, then the system 100 can generate a recommendation that indicates that the first operating environment 130 would achieve increase accuracy if it replaced its sensor 145a of model A with a sensor 145a of model B.

The components of the system 100 can be executed on one or more computers running on-premises, e.g., where the workcell is built and operated. Alternatively or in addition, some of the components can be hosted within one or more data centers, which can be each be distributed computing systems having hundreds or thousands of computers in one or more locations. Some components can be made available as services, such as web services, and accessed remotely by other components that are not co-located.

Figure 2:
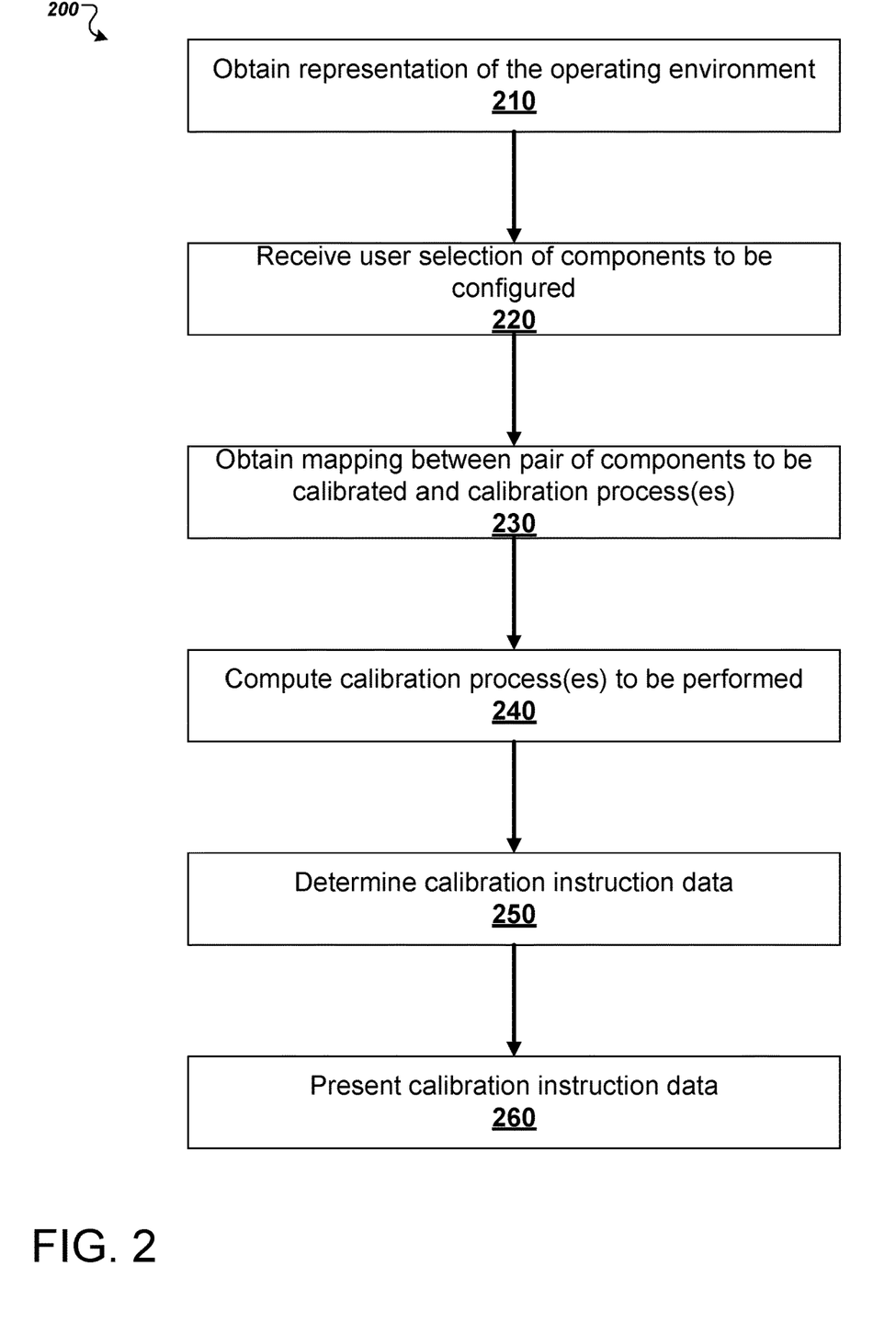
FIG. 2 is a flow diagram of an example process that determines calibration instruction data which describes calibration processes to be performed on components of an operating environment such as workcell.

FIG. 2 is a flow diagram of an example process 200 that determines calibration instruction data, which describes calibration processes to be performed on components of an operating environment such as workcell. For convenience, the process 200 will be described as being performed by a system of one or more computers located in one or more locations. For example, a system determining calibration instruction data, e.g., the system 100 of FIG. 1, appropriately programmed, can perform the process 200. The process 200 can be executed in response to a user indication given when a workcell is first configured or when a change to a workcell occurs.

The system obtains (210) a representation of an operating environment. The representation can include indications of the components of the operating environment. The representation can also include a specific listing of components or a descriptor that indicates the components.

For example, the entity that assembles the workcell can create a representation of the components of the workcell in a configuration listing available to the system, and the system can obtain the representation from the listing. The configuration listing can include a specific listing of components, such as {Robot: manufacturer X, model 1.1; Robot: manufacturer X, Model 2.3; Camera: manufacturer C, Model A4; Camera: manufacturer C, Model A7; Camera manufacturer D, Model B2}. Alternatively, the configuration listing can include descriptors of the components, such as Robot 12 to indicate {Robot: manufacturer X, Model 1.1} and Robot 13 to indicate {Robot: manufacturer X, Model 2.3}. In another alternative, the configuration listing can include a descriptor of multiple components, such as: {Configuration G} to indicate {Robot: manufacturer X, model 1.1; Robot: manufacturer X, Model 2.3; Camera: manufacturer C, Model A4; Camera: manufacturer C, Model A7; Camera manufacturer D, Model B2}. These alternatives can also be combined in a single configuration listing.

Alternatively, the system can obtain a representation of the operating environment the using a discovery mechanism. For example, the system can query the robot interface subsystem, and the robot interface subsystem would return an indication of the components that are installed in the workcell. As described above, the indication can be an enumeration of components, or descriptors used by the system to enumerate components.

The system receives (220) a user selection of components to be configured to operate in the robotic operating environment. The components can include one or more robots and one or more sensors. The user selection can made using a user interface generated by the system, such as the user interface illustrated in FIG. 3. For example, the listing described in reference to step 210 can be presented in a user interface as user-selectable data, allowing a user to indicate a subset of the configuration that is of interest. The listing, or the user-selected subset of the listing, can be stored as a file in a file system available to the system or as a database record that can be retrieved by the system using a database query.

Alternatively or in addition, if the representation in step 210 includes a descriptor (e.g., "Configuration G"}, the system can use the descriptor to retrieve information about the components in the operating environment. The system can use the descriptor to retrieve information from a repository residing within the system, from repositories maintained by the manufacturers of components of the operating environment, from repositories maintained by other parties such as standards bodies, from other repositories external to the system, or from any combination of repositories.

In step 230, the system obtains mappings between pairs of components to be calibrated and calibration processes. The mappings can be stored, for example, in the calibration information repository of FIG. 1. Multiple approaches can be used to obtain mappings, as described below.

The system can obtain mappings using rules, such as a rule that specifies one or more calibration processes for a given pair of components. For example, a rule might take the format: "{{A,B},{C,D,E}}" to indicate that for components A and B, calibration processes C, D and E should be executed. Rules can optionally include "wildcard characters." For example, a rule might of format: "{{A,*},{F}}" can mean that for component A with any other component, as indicated by the wildcard character "*," calibration process F should be executed.

Rules used to determine mappings can be provided by any entity associated with the operating environment, such as providers of calibration software and system, providers of workcell-related software and systems, manufacturers of components of the workcell, installers or operators of the operating environment or other operating environments, and so on. Rules can be included in a listing that is stored in a file system, in a database available to the system, or in a similar format.

Alternatively or in addition, one or more machine learning models can be trained on data obtained by collecting information from calibrations in other operating environments, and used by the system to obtain mappings. For example, the system can automatically compile data representing the components installed in workcells operated by other entities who are also executing the same robotic control software platform. For example, the system can obtain identifiers of the types of components in the operating environments as well as the types of calibration processes that were performed on those components before the workcell started a particular task. The calibration processes that were performed may or may not be calibration processes that the system itself recommended. In other words, the system can iteratively update the calibration processes that it includes in a mapping according to what expert users actually decided to use for calibrating their components.

As one example, the system can obtain information on prior calibration attempts, including a description of the operating environment components present, the calibration process(es) used in the calibration, the resulting accuracy produced by the calibration process, and any other appropriate data. The system can compile all of this data to be used as features in training a machine learning model. In some implementations, the system can automatically label the training data according to the resulting measure of accuracy in each operating environment. For example, a suite of calibration processes that achieved accuracy above a particular threshold can be labeled a positive outcome, and conversely, accuracy below a particular threshold can be labeled as a negative outcome. The system can then use the generated features and the resulting calibration outcomes to train a machine learning model that is used to map workcell components to calibration processes that are likely to result in high-quality calibration of those workcell components. The system can use any appropriate machine learning model, e.g., using logistic regression or a decision tree.

Trained machine learning models used to generate mappings can be provided by any entity associated with the operating environment, such as providers of calibration software and system, providers of workcell-related software and systems, manufacturers of components of the workcell, installers or operators of the operating environment or other operating environments, and so on.

The mapping that is obtained can be of a form that lists, for each pair of components, one or more calibration processes. For example, for components {A,B}, the mapping can be expressed as {{A,B}{{C,D,E},{F}}, which can indicate that, for components {A,B}, two calibration processes exist,{C,D,E} and {F}.

The system computes (240), from the mapping obtained in step 230, the calibration processes to be performed on the components selected by the user in step 220. When multiple calibration processes can be available for a pair of components, the system can use various approaches.

In one implementation, the system combines all processes. In the example above, the calibration process could consist of the calibration process {C, D, E} and the calibration process {F}.

In some implementations, calibration processes can have associated priorities, and only the highest-priority matching rule can be selected. For example, if {C,D,E} has priority 5 and {F} has priority 3, the computed calibration process can be {C,D,E}.

In some implementations, rules can be used to select among, or to combine, calibration processes. Rules can specify that a certain calibration process is to be used ahead of any other process, that various processes should be combined, that processes should be performed in a prescribed order, and so on.

In some implementations, trained machine learning models can be used to select among, or to combine, calibration processes. The machine learning model can be trained using the results of prior calibrations performed in various combinations and orders, with successful calibrations used as positive training examples, and unsuccessful calibrations used as negative training example.

The system determines (250) calibration instruction data relevant to the components of the operating environment 130 determined in step 240. Calibration instruction data can include descriptions of specific processes used to calibrate components of the operating environment. For example, the calibration instruction data can include instructions for calibrating one component, two or more components together, one component with respect to a second component, one component with respect to multiple other components, multiple components with respect to multiple other components, or various other combinations of calibration instruction data. The system can determine calibration instruction data by executing one or more rules identified by the calibration information. Alternatively or in addition, the system can determine calibration instruction data by executing a machine learning model identified by calibration instruction data. The system 100 can use features associated with the operating environment identified in step 220 when executing the machine learning model.

The system can present (260) the calibration instruction data determined in step 250, for example, on a user interface device. The user interface device can include a laptop computer, a mobile device such as a cellular phone or tablet computer or a desktop computer with a monitor. The system can present the information associated with the calibration instruction data on the user interface device as an unordered list, as a ranked or prioritized list, or as suggestions such as "tool tips," and the system can allow the user to select among these or other display options.

Figure 3:
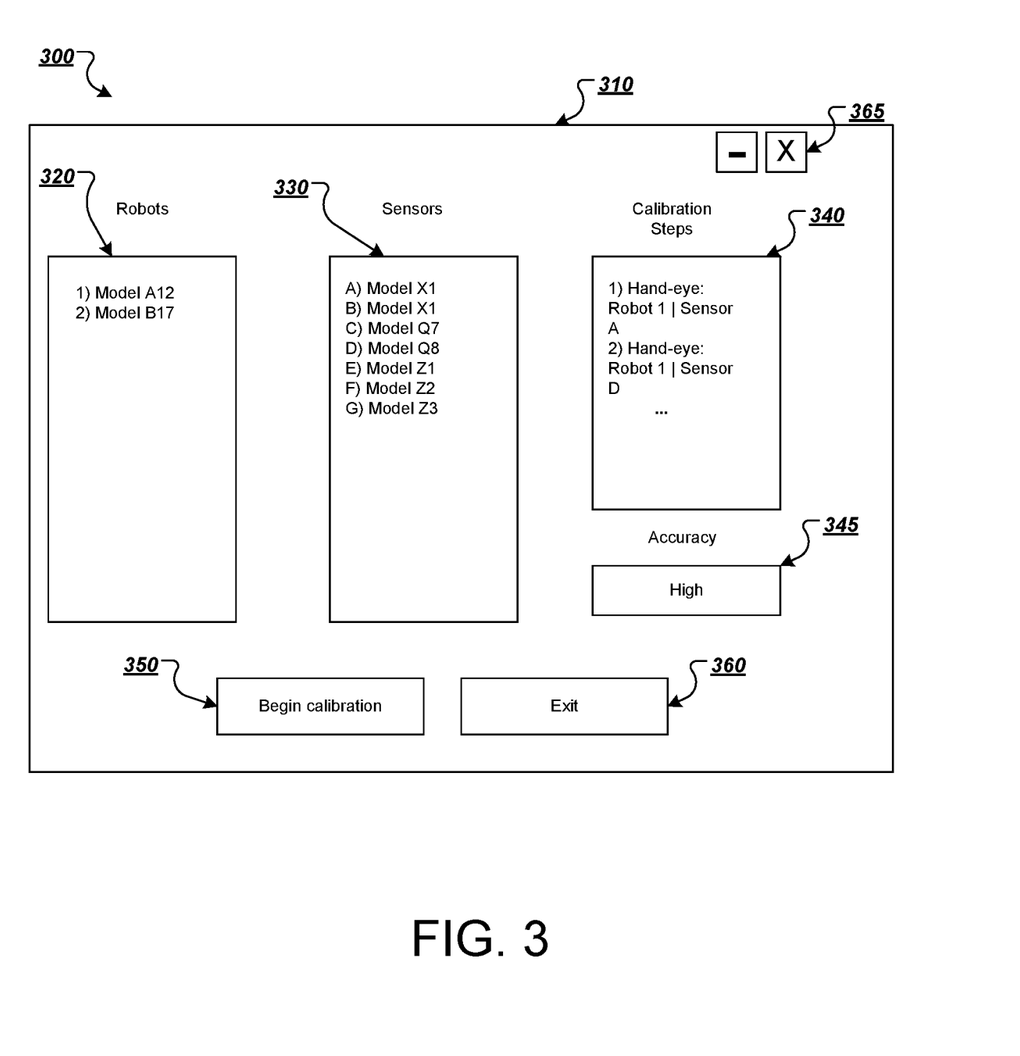
FIG. 3 illustrates an example user interface.

FIG. 3 illustrates an example user interface 300 containing multiple panes. The main user interface pane 310 can contain additional panes.

The robots pane 320 can contain a listing of robots contained in the operating environment 130. The robots pane 320 can contain a listing of specific types and models of robots in the operating environment, descriptive text relating to the robots 140 in the operating environment 130, user-selected text relating to the robots 140 in the operating environment 130, any combination, or similar descriptions.

The sensors pane 330 can contain a listing of sensors in the operating environment. The sensors pane 330 can contain a listing of specific types and models of sensors in the operating environment 130, descriptive text relating to the sensors in the operating environment 130, user-selected text relating to the sensors in the operating environment, any combination, or similar descriptions.

The calibration steps pane 340 can show the steps recommended by the system 100 for calibrating the components of the operating environment. The calibration steps pane 340 can contain detailed descriptions of the calibration steps recommended to configure the operating environment, references to operating manuals that contain detailed descriptions, user-selected text related to the recommended calibration steps, any combination, or similar descriptions.

The accuracy pane 345 can show, for the calibration steps indicated in the calibration steps pane 340, the expected accuracy. For example, the measure of accuracy can be indicated as "high," "medium," or "low" or as a numeric indication of accuracy.

The robots pane 320, the sensors pane 330 and the calibration steps pane 340 can be populated using the output data generated by the system and passed to the user interface device. For example, the calibration determination engine can identify the robots and sensors present in the operating environment from operating environment descriptions and include indications of that information in the calibration instruction data passed by the system to the user interface engine. The calibration determination engine can also determine the recommended calibration steps for the operating environment and include that information, along with an indication of accuracy, in the calibration instruction data passed by the system to the user interface engine. The user interface engine can then pass output data indicative of the information in the calibration instruction data 165 to the user interface device. The user interface device can then render the user interface 300.

The entries in the robot pane 320 and in sensor pane 330 can be selected by a user to identify robots and sensors of interest. When the user selects robots in the robot pane 320 and/or sensors in the sensor pane 330, the system updates the calibration steps shown in the calibration pane 340 and the accuracy shown in the accuracy pane 345 to reflect the calibration steps relevant to the selected robots and sensors. For example, the system can filter the calibration steps included in the calibration pane 340 to show only the calibration steps relevant to the selected robots and/or sensors, and adjust the accuracy shown in the accuracy pane 345 to reflect the accuracy associated with executing those calibration steps.

The main user interface pane 310 can contain a button 350 that allows a user to indicate that the system 100 should initiate calibration processes. If pressed, the user interface device 110 can send a signal to the calibration engine 180 indicating that calibration should begin.

The main user interface pane 310 can also contain other user interface elements commonly included in user interface panes, such as an exit button 360 and exit icon 365.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining a representation of a robotic operating environment;
  receiving a user selection of a plurality of components to be configured to operate in the robotic operating environment, wherein the plurality of components comprise one or more robots and one or more sensors;
  obtaining a mapping between pairs of components to be calibrated and one or more respective calibration processes to perform to calibrate each pair of components;
  computing, from the mapping, one or more calibration processes to be performed on pairs of components based on the user selection of the plurality of components;
  determining calibration instruction data describing how to perform the one or more calibration processes to be performed on the pairs of components of the user selection; and
  presenting the calibration instruction data for calibrating the user selection of the plurality of components in the robotic operating environment.

Embodiment 2 is method of embodiment 1, wherein the calibration instruction data describing the at least one calibration process to be performed on the at least one component in the operating environment further includes data describing at least one second component in the operating environment, wherein the at least one calibration process calibrates the at least one first component with respect to the at least one second component.

Embodiment 3 is the method of any one of embodiments 1-2, wherein the calibration information reflects the outcome of performing calibration processes in a second operating environment.

Embodiment 4 is the method of any one of embodiments 1-3, further comprising causing a calibration engine to perform the processes identified by the calibration instruction data.

Embodiment 5 is the method of any one of claims 1-4 wherein:
  the calibration information comprises a set of rules;
  at least one rule in the set of rules comprises at least one predicate and at least one result,
  wherein the result is related to calibration instruction data;
  evaluating, by the system, at least one rule to determine calibration instruction data.

Embodiment 6 is the method of any one of embodiments 1-5, wherein the operating environment comprises a virtual representation of a physical workcell.

Embodiment 7 is the method of any one of embodiments 1-6, wherein the operating environment comprises a physical workcell.

Embodiment 8 is the method of any one of embodiments 1-7, further comprising:
  obtaining, by the server, the results of executing at least one calibration process in a second operating environment;
  adjusting, by the server, at least one calibration information data, wherein the adjustment relates to the obtained results.

Embodiment 9 is the method of any one of embodiments 1-8, wherein the calibration instruction data includes an indication of accuracy.

Embodiment 10 is the method of any one of embodiments 1-9, wherein the calibration instruction data includes an indication of complexity associated with performing at least one calibration process.

Embodiment 11 is the method of any one of embodiments 1-10, wherein determining, by the server system, calibration instruction data comprises:

providing calibration data to a machine learning model that is configured to recommend calibration information data;

executing the machine learning model;

determining calibration information data from the results of executing the machine learning model.

Embodiment 12 is the method of any one of embodiments 1-11, further comprising:

determining, by the server, recommendations relating to components in the operating environment, wherein the recommendations relate to improving the accuracy associated with at least one calibration instruction data; and presenting, by the server, indications of the recommendations.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
    obtaining a representation of a robotic operating environment;
    receiving a user selection of a plurality of components to be configured to operate in the robotic operating environment, wherein the plurality of components comprise one or more robots and one or more sensors;
    obtaining a mapping between different pairs of components to be calibrated and different respective sets of calibration processes to be performed to calibrate each pair of components;
    computing, from the mapping, one or more calibration processes to be performed on pairs of components based on the user selection of the plurality of components;
    determining calibration instruction data describing how to perform the one or more calibration processes to be performed on the pairs of components of the user selection; and
    presenting the calibration instruction data for calibrating the user selection of the plurality of components in the robotic operating environment.

2. The method of claim 1, wherein the calibration instruction data describing the at least one calibration process to be performed on the at least one component in the operating environment further includes data describing at least one second component in the operating environment, wherein the at least one calibration process calibrates the at least one first component with respect to the at least one second component.

3. The method of claim 1, further comprising presenting calibration information that reflects the outcome of performing calibration processes in a second operating environment.

4. The method of claim 1, further comprising causing a calibration engine to perform the processes identified by the calibration instruction data.

5. The method of claim 1, wherein:
    the mapping comprises a set of rules;
    at least one rule in the set of rules comprises at least one predicate and at least one result, wherein the result is related to calibration instruction data; and
    evaluating, by the system, at least one rule to determine calibration instruction data.

6. The method of claim 1, wherein the operating environment comprises a virtual representation of a physical workcell.

7. The method of claim 1, wherein the operating environment comprises a physical workcell.

8. The method of claim 1, further comprising:
    obtaining, by a server, the results of executing at least one calibration process in a second operating environment; and
    adjusting, by the server, at least one calibration information data, wherein the adjustment relates to the obtained results.

9. The method of claim 1, wherein the calibration instruction data includes an indication of accuracy.

10. The method of claim 1, wherein the calibration instruction data includes an indication of complexity associated with performing at least one calibration process.

11. The method of claim 1, wherein determining the calibration instruction data comprises:

providing calibration data to a machine learning model that is configured to recommend calibration instruction data;

executing the machine learning model; and determining calibration instruction data from the results of executing the machine learning model.

12. The method of claim 1, further comprising:

determining recommendations relating to components in the operating environment, wherein the recommendations relate to improving the accuracy associated with at least one calibration instruction data; and presenting indications of the recommendations.

13. One or more non-transitory computer-readable storage media storing instructions that when executed by one or more computers cause the one or more computers to perform operations comprising:

obtaining a representation of a robotic operating environment;

receiving a user selection of a plurality of components to be configured to operate in the robotic operating environment, wherein the plurality of components comprise one or more robots and one or more sensors;

obtaining a mapping between different pairs of components to be calibrated and different respective sets of calibration processes to be performed to calibrate each pair of components;

computing, from the mapping, one or more calibration processes to be performed on pairs of components based on the user selection of the plurality of components;

determining calibration instruction data describing how to perform the one or more calibration processes to be performed on the pairs of components of the user selection; and presenting the calibration instruction data for calibrating the user selection of the plurality of components in the robotic operating environment.

14. The one or more non-transitory computer-readable storage media of claim 13, wherein the calibration instruction data describing the at least one calibration process to be performed on the at least one component in the operating environment further includes data describing at least one second component in the operating environment, wherein the at least one calibration process calibrates the at least one first component with respect to the at least one second component.

15. The one or more non-transitory computer-readable storage media of claim 13, wherein the operations further comprise presenting calibration information that reflects the outcome of performing calibration processes in a second operating environment.

16. The one or more non-transitory computer-readable storage media of claim 13, further comprising causing a calibration engine to perform the processes identified by the calibration instruction data.

17. A system comprising one or more computers and one or more storage devices storing instructions that when executed by the one or more computers cause the one or more computers to perform operations comprising:

obtaining a representation of a robotic operating environment;

receiving a user selection of a plurality of components to be configured to operate in the robotic operating environment, wherein the plurality of components comprise one or more robots and one or more sensors;

obtaining a mapping between different pairs of components to be calibrated and different respective sets of calibration processes to be performed to calibrate each pair of components;

computing, from the mapping, one or more calibration processes to be performed on pairs of components based on the user selection of the plurality of components;

determining calibration instruction data describing how to perform the one or more calibration processes to be performed on the pairs of components of the user selection; and presenting the calibration instruction data for calibrating the user selection of the plurality of components in the robotic operating environment.

18. The system of claim 17, wherein the calibration instruction data describing the at least one calibration process to be performed on the at least one component in the operating environment further includes data describing at least one second component in the operating environment, wherein the at least one calibration process calibrates the at least one first component with respect to the at least one second component.

19. The system of claim 17, wherein the operations further comprise presenting calibration information that reflects the outcome of performing calibration processes in a second operating environment.

20. The system of claim 17, further comprising causing a calibration engine to perform the processes identified by the calibration instruction data.

21. A computer-implemented method comprising:

obtaining a representation of a robotic operating environment;

receiving a user selection of a plurality of components to be configured to operate in the robotic operating environment, wherein the plurality of components comprise one or more robots and one or more sensors;

obtaining a mapping between pairs of components to be calibrated and one or more respective calibration processes to perform to calibrate each pair of components;

computing, from the mapping, one or more calibration processes to be performed on pairs of components based on the user selection of the plurality of components;

determining calibration instruction data describing how to perform the one or more calibration processes to be performed on the pairs of components of the user selection, including:

providing calibration data to a machine learning model that is configured to recommend calibration instruction data, executing the machine learning model, and determining calibration instruction data from the results of executing the machine learning model; and presenting the calibration instruction data for calibrating the user selection of the plurality of components in the robotic operating environment.

* * * * *